(12) United States Patent
Krishnamoorthy et al.

(10) Patent No.: US 11,557,107 B2
(45) Date of Patent: Jan. 17, 2023

(54) INTELLIGENT RECOGNITION AND EXTRACTION OF NUMERICAL DATA FROM NON-NUMERICAL GRAPHICAL REPRESENTATIONS

(71) Applicant: BANK OF AMERICA CORPORATION, Charlotte, NC (US)

(72) Inventors: Madhusudhanan Krishnamoorthy, Hasthinapuram (IN); Kannan Govindan, Triplicane (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1001 days.

(21) Appl. No.: 16/238,240

(22) Filed: Jan. 2, 2019

(65) Prior Publication Data

US 2020/0210748 A1 Jul. 2, 2020

(51) Int. Cl.

| | |
|---|---|
| *G06V 10/426* | (2022.01) |
| *G06N 3/04* | (2006.01) |
| *G06K 9/62* | (2022.01) |
| *G06T 7/13* | (2017.01) |
| *G06T 7/136* | (2017.01) |
| *G06V 10/44* | (2022.01) |
| *G06V 30/10* | (2022.01) |

(52) U.S. Cl.
CPC .......... *G06V 10/426* (2022.01); *G06K 9/628* (2013.01); *G06K 9/6228* (2013.01); *G06N 3/04* (2013.01); *G06T 7/13* (2017.01); *G06T 7/136* (2017.01); *G06V 10/44* (2022.01); *G06T 2207/20072* (2013.01); *G06T 2207/20084* (2013.01); *G06V 30/10* (2022.01)

(58) Field of Classification Search
CPC .... G06K 9/6228; G06K 9/628; G06K 9/6271; G06N 3/04; G06N 3/0454; G06V 10/426; G06V 10/44; G06V 10/82; G06V 30/10; G06V 30/412; G06V 30/422; G06T 2207/20072; G06T 2207/20084; G06T 7/13; G06T 7/136
See application file for complete search history.

(56) References Cited

U.S. PATENT DOCUMENTS

| | | | |
|---|---|---|---|
| 5,542,006 | A | 7/1996 | Shustorovich et al. |
| 6,996,268 | B2 | 2/2006 | Megiddo et al. |
| 7,747,070 | B2 | 6/2010 | Puri |
| 8,345,984 | B2 | 1/2013 | Ji et al. |

(Continued)

*Primary Examiner* — Dakshesh D Parikh
(74) *Attorney, Agent, or Firm* — Moore & Van Allen PLLC; Nicholas C. Russell (57) ABSTRACT

Embodiments of the invention are directed to systems, methods, and computer program products for a unique platform for analyzing, classifying, extracting, and processing information from graphical representations. Embodiments of the inventions are configured to provide an end to end automated solution for extracting data from graphical representations and creating a centralized database for providing graphical attributes, image skeletons, and other metadata information integrated with a graphical representation classification training layer. The invention is designed to receive a graphical representation for analysis, intelligently identify and extract objects and data in the graphical representation, and store the data attributes of the graphical representation in an accessible format in an automated fashion.

20 Claims, 5 Drawing Sheets

(56) References Cited

U.S. PATENT DOCUMENTS

| | | | |
|---|---|---|---|
| 8,504,361 | B2 | 8/2013 | Collobert et al. |
| 8,799,772 | B2 | 8/2014 | Megiddo et al. |
| 9,190,053 | B2 | 11/2015 | Penn et al. |
| 9,286,524 | B1 | 3/2016 | Mei et al. |
| 9,430,557 | B2 | 8/2016 | Bhat et al. |
| 9,430,558 | B2 | 8/2016 | Bhat et al. |
| 9,430,829 | B2 | 8/2016 | Madabhushi et al. |
| 9,542,626 | B2 | 1/2017 | Martinson et al. |
| 9,563,825 | B2 | 2/2017 | Shen et al. |
| 9,589,374 | B1 | 3/2017 | Gao et al. |
| 9,697,416 | B2 | 7/2017 | Shen et al. |
| 9,697,444 | B2 | 7/2017 | Wu et al. |
| 9,805,483 | B2 | 10/2017 | Wilson et al. |
| 9,977,997 | B2 | 5/2018 | Bai et al. |
| 10,095,677 | B1 * | 10/2018 | Manohar ................ G06V 10/50 |
| 10,235,606 | B2 | 3/2019 | Miao et al. |
| 2014/0180989 | A1 | 6/2014 | Krizhevsky et al. |
| 2016/0035078 | A1 | 2/2016 | Lin et al. |
| 2016/0117587 | A1 | 4/2016 | Yan et al. |
| 2016/0358321 | A1 | 12/2016 | Xu et al. |
| 2017/0103299 | A1 | 4/2017 | Aydonat et al. |
| 2017/0200078 | A1 | 7/2017 | Bichler |
| 2017/0351913 | A1 * | 12/2017 | Chen ....................... G06V 30/40 |
| 2018/0004405 | A1 * | 1/2018 | Campbell ........... G06F 3/04855 |
| 2018/0204360 | A1 * | 7/2018 | Bekas ................. G06K 9/6297 |
| 2018/0336405 | A1 * | 11/2018 | Messina ............... G06V 30/412 |
| 2019/0005358 | A1 * | 1/2019 | Pisoni .................... G06V 10/82 |
| 2019/0266434 | A1 * | 8/2019 | Yu ......................... G06T 11/206 |
| 2020/0126663 | A1 * | 4/2020 | Lucas .............. G06V 30/19013 |
| 2020/0311407 | A1 * | 10/2020 | Nepomniachtchi .... G06V 30/40 |

* cited by examiner

INTELLIGENT RECOGNITION AND EXTRACTION OF NUMERICAL DATA FROM NON-NUMERICAL GRAPHICAL REPRESENTATIONS

FIELD OF THE INVENTION

The present invention generally relates to the field of automated and flexible information extraction for graphical representations such as charts and graphs. In particular, the novel present invention provides a unique platform for analyzing, classifying, extracting, and processing information from graphical representations. Embodiments of the inventions are configured to provide an end to end automated solution for extracting data from graphical representations and creating a centralized database for providing graphical attributes, image skeletons, and other metadata information integrated with a graphical representation classification training layer.

BACKGROUND

Current tools for data extraction from graphical representations do not provide an end to end automated solution for extraction and classification of data in consistent useable format. In many current processes, techniques and systems, a user is required to manually select graphical attributes and calibrate axis metrics for proper data extraction. As such, these processes are time consuming, prone to human error, and result in data that is not uniform. The output data produced by such conventional solutions are often minimally useful and have a potential for producing unintended effects or unhelpful data analysis when unattended by comprehensive human review. In addition, conventional approaches to graphical representation analysis may lack functionality across multiple types of graphical representations; for instance, charts or graphs of different types and categories that may display data and variables in different formats. As such, analysis results often do not allow for direct comparison, and may requires the investment of inefficient manual effort. As such, a need exists for a solution to automatically analyze graphical representations to identify data formats, extract uniform data, and automate the creation of a centralized database architecture for storing and communicating extracted data.

The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for information extraction and analysis. Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive a graphical representation for analysis; process the graphical representation to convert the graphical representation to a standard file type and remove unnecessary information; detect features within the graphical representation using a convolutional neural network analysis by identifying boundary thresholds and contours within the graphical representation; generate a feature map of the graphical representation comprising detected features in the graphical representation; access a chart repository containing classification attributes and proportional information for multiple chart types; classify the graphical representation according to one of the multiple chart types based on the classification attributes from the chart repository; analyze the detected features using proportional information for the classification of the graphical representation; extract data from the detected features using optical character recognition and proportional analysis; and store the extracted data in an accessible format, wherein the extracted data from the detected features includes contour data and numerical data series.

In some embodiments, the detection of objects within the graphical representation further comprises repeatedly analyzing the graphical representation to identify regions of interest within the graphical representation.

In some embodiments the proportional information comprises thresholds for identifying boundaries and contours based on differences identified in the pixel data for the graphical representation.

In some embodiments, the feature map comprises overlaying feature masks and annotated information on the graphical representation.

In some embodiments, extracting the data from the detected features includes parsing the detected features and creating separate files for each detected feature.

In some embodiments, storing the extracted data in an accessible format further comprises storing the detected features, contour data, and numerical data series in an extensible markup language file.

In some embodiments, the standard file type comprises a tag image file format.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user data that includes only personal information associated with the user, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

Figure 1:
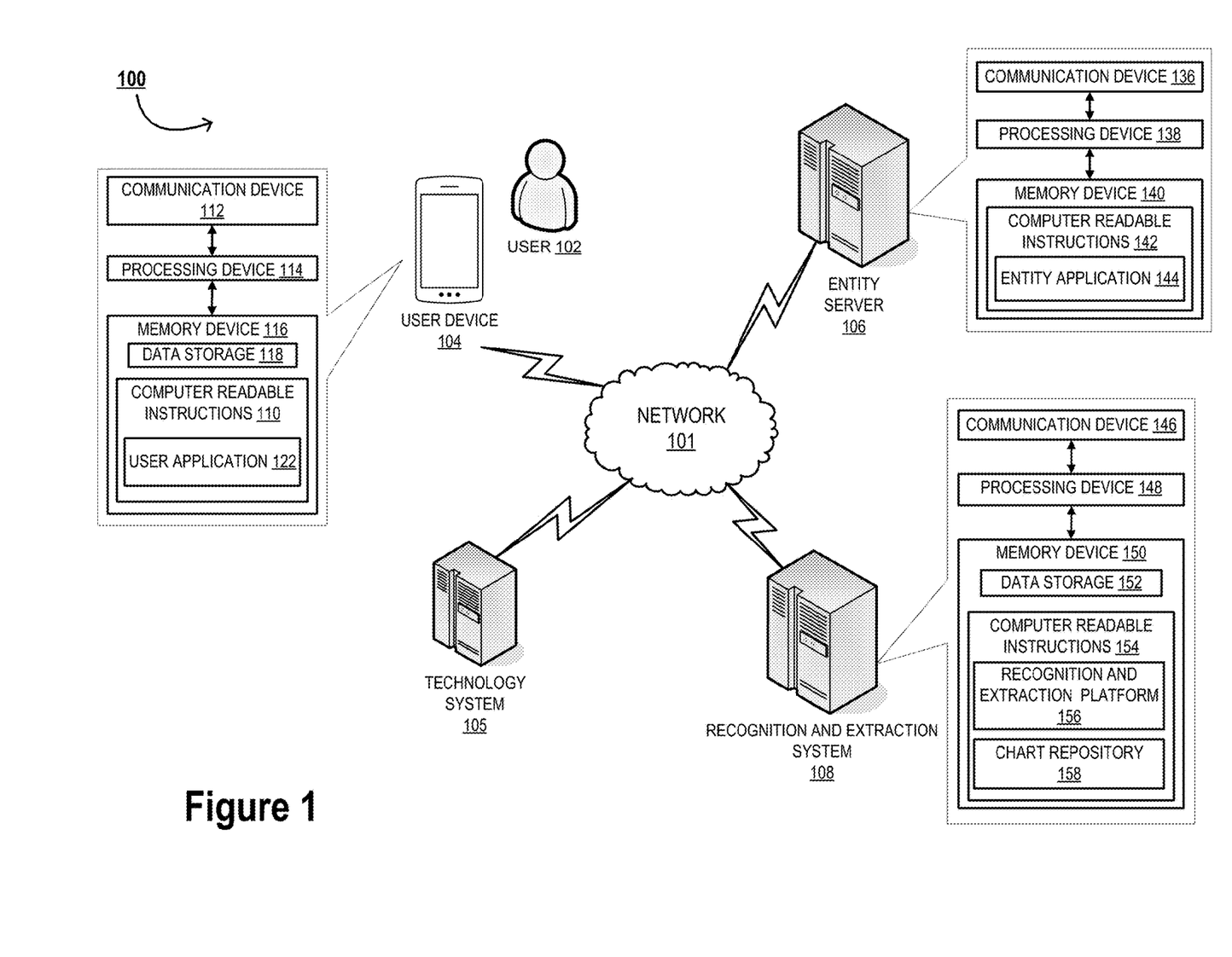
FIG. 1 depicts a recognition and extraction system environment 100, in accordance with one embodiment of the present invention.

FIG. 1 depicts a recognition and extraction system environment 100, in accordance with one embodiment of the present invention. As illustrated in FIG. 1, a recognition and extraction system 108 is operatively coupled, via a network 101 to a user device 104, to an entity server 106, and to a technology system 105. In this way, the recognition and extraction system 108 can send information to and receive information from the user device 104, the entity server 106, and the technology system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the recognition and extraction system 108, is configured for receiving software code for analysis, performing code analysis using a deep learning algorithm, encoding software program attributes into vectorized representational components, and populating database to further assess and compare program functionalities and redundancies in an efficient manner.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide graphical representations for analysis, recognition and extraction, query the recognition and extraction system 108 for identified attributes, set parameters and metrics for data analysis, and/or receive/utilize centralized database information created and disseminated by the recognition and extraction system 108. As such, in some embodiments, the user 102 may be associated with the entity and/or a financial institution. In other embodiments, the user 102 may be associated with another system or entity, such as technology system 105, which may be a third party system which is granted access to the recognition and extraction system 108 or entity server 106 in some embodiments.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the entity server 106, the recognition and extraction system 108 and the technology system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the recognition and extraction system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the recognition and extraction system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, based on computer-readable instructions thereof, which may be stored in a memory device, for example, executing computer readable instructions 154 or computer-readable program code 154 stored in memory device 150 to perform one or more functions associated with the recognition and extraction system 108.

The processing device 148 is operatively coupled to the communication device 146 and the memory device 150. The processing device 148 uses the communication device 146 to communicate with the network 101 and other devices on the network 101, such as, but not limited to the entity server 106, the technology system 105, and the user system 104. As such, the communication device 146 generally comprises a modem, server, or other device for communicating with other devices on the network 101.

As further illustrated in FIG. 1, the recognition and extraction system 108 comprises the computer-readable instructions 154 stored in the memory device 150, which in one embodiment includes the computer-readable instructions for the implementation of a recognition and extraction platform 156. In some embodiments, the computer readable instructions 154 comprise executable instructions associated with the recognition and extraction platform 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the recognition and extraction platform 156 and its components/modules. The recognition and extraction platform 156 is further configured to perform or cause other systems and devices to perform the various steps in processing software code, and organizing data as will be described in detail later on.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to the recognition and extraction platform 156, entity server 106, user device 104, and technology system 105 and/or other systems and applications, to perform one or more steps described throughout this disclosure. Although various data processing steps may be described as being performed by the recognition and extraction platform 156 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the recognition and extraction system 108 may include multiple systems, servers, computers or the like maintained by one or many entities. FIG. 1 merely illustrates one of those systems 108 that, typically, interacts with many other similar systems to form the information network. In one embodiment of the invention, the recognition and extraction system 108 is operated by the entity associated with the entity server 106, while in another embodiment it is operated by a second entity that is a different or separate entity from the entity server 106. In some embodiments, the entity server 106 may be part of the recognition and extraction system 108. Similarly, in some embodiments, the recognition and extraction system 108 is part of the entity server 106. In other embodiments, the entity server 106 is distinct from the recognition and extraction system 108.

In one embodiment of the recognition and extraction system 108, the memory device 150 stores, but is not limited to, the recognition and extraction platform 156 as will be described later on with respect to FIG. 2. In one embodiment of the invention, the recognition and extraction platform 156 may associated with computer-executable program code that instructs the processing device 148 to operate the network communication device 146 to perform certain communication functions involving the technology system 105, the user device 104 and/or the entity server 106, as described herein. In one embodiment, the computer-executable program code of an application associated with the recognition and extraction platform 156 may also instruct the processing device 148 to perform certain logic, data processing, and data storing functions of the application.

The processing device 148 is configured to use the communication device 146 to receive data, such as graphical representations, or metadata associated with graphical representations, transmit and/or cause display of extracted data and the like. In the embodiment illustrated in FIG. 1 and described throughout much of this specification, the recognition and extraction platform 156 may perform one or more of the functions described herein, by the processing device 148 executing computer readable instructions 154 and/or executing computer readable instructions associated with one or more application(s)/devices/components of the recognition and extraction platform 156.

As illustrated in FIG. 1, the entity server 106 is connected to the recognition and extraction system 108 and may be associated with a financial institution network. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the recognition and extraction system 108. The recognition and extraction system 108 may communicate with the entity server 106 via a secure connection generated for secure encrypted communications between the two systems for communicating data for processing across various applications.

As further illustrated in FIG. 1, in some embodiments, the threat intelligence forest system environment 100 further comprises a technology system 105, in operative communication with the recognition and extraction system 108, the entity server 106, and/or the user device 104. Typically, the technology system 105 comprises a communication device, a processing device and memory device with computer readable instructions. In some instances, the technology system 105 comprises a first database/repository comprising software code or program component objects, and/or a second database/repository comprising functional source code associated with software or program component objects and attributes. These applications/databases may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
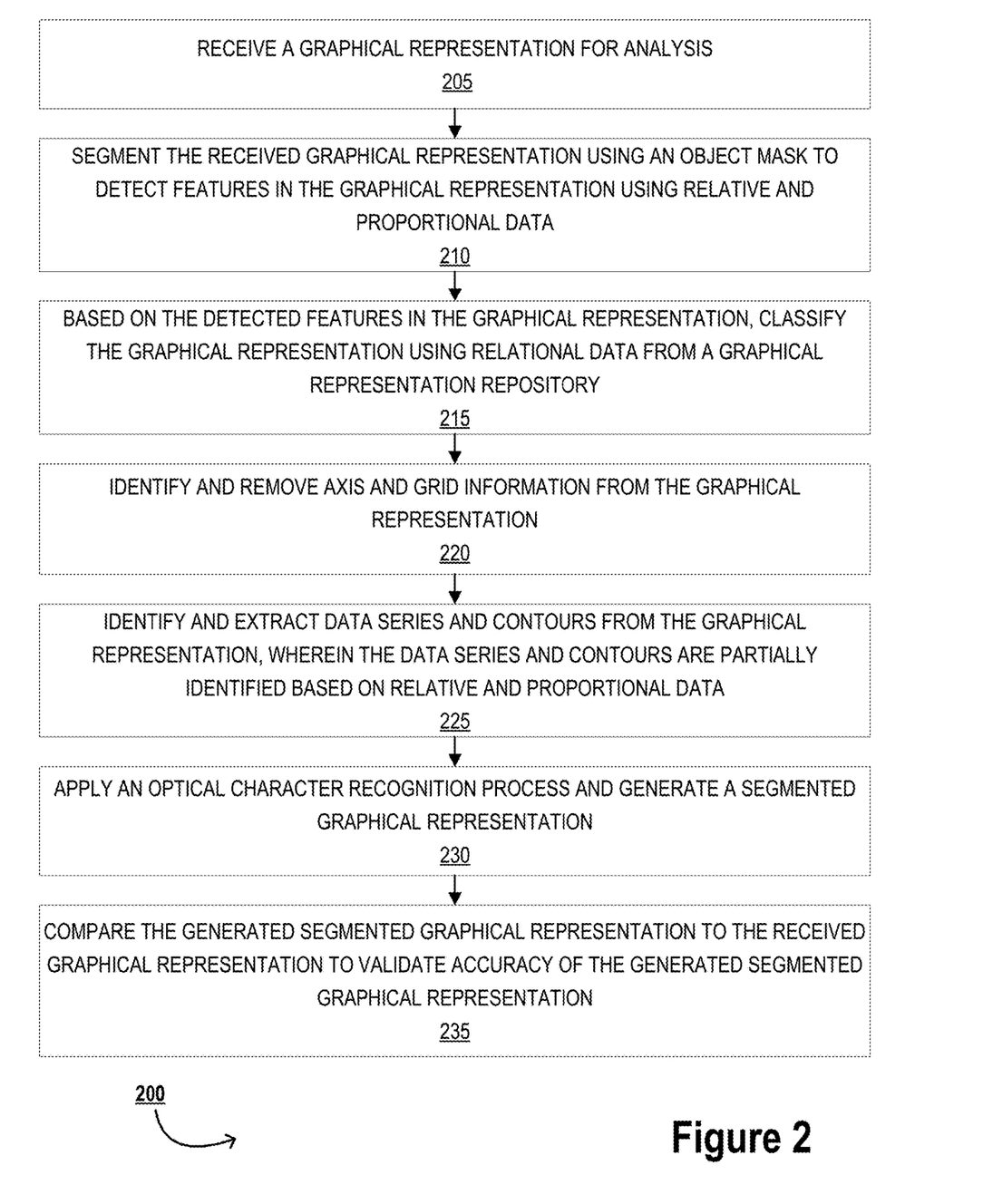
FIG. 2 depicts a high level process flow 200 for information recognition, extraction and analysis, in accordance with one embodiment of the present invention.

FIG. 2 depicts a high level process flow 200 for information recognition, extraction and analysis, in accordance with one embodiment of the present invention. The process flow 200 describes the overall process for extracting numerical representations from various graphical representations such that the resulting data may be categorized and analyzed further in a uniform manner. As shown at block 205, the process begins when the system receives a graphical representation for analysis. The graphical representation may be any number of graphical file types, such as, but not limited to JPEG, BMP, TIFF, GIF, PNG, RAW, PDF, and the like. The system segments the graphical representation using an object mask to detect objects in the graphical representation, as shown in block 210. In doing so, the system uses relative and proportional data to detect objects and attributes within the graphical representation. The system then classifies the graphical representation based on data from a chart repository 158, as shown by block 215. For instance, the system may detect objects within the graphical representation that correspond to certain chart types, such as, for example, pie charts, line graphs, scatter plots, bar graphs, and the like.

Next, the process proceeds wherein the system identifies and removes axis and grid information from the graphical representation, as shown by block 220. The system may then identify and extract data series and contours from the graphical representation, wherein the data series and contours and partially identified based on relative and proportional data determined by the object mask layer. In some embodiments, the recognition of data series from contours may be achieved by use of a combination of regression analysis, text mining, and classification analysis. This data is organized and stored in a database such that it can be easily incorporated into a detailed dashboard of graphical representation attributes. Next, the process applies an optical character recognition process to transform any identified text data into a searchable format, and generates a segmented graphical representation, as shown by block 230. Segmented information and identified text data is compiled and stored in the database for incorporation in the detailed dashboard of graphical representation attributes. Finally, as shown by block 235, the segmented graphical representation is compared to the originally received graphical representation to validate that the resulting segmented graphical representation maintains an accurate overall depiction.

Figure 3:
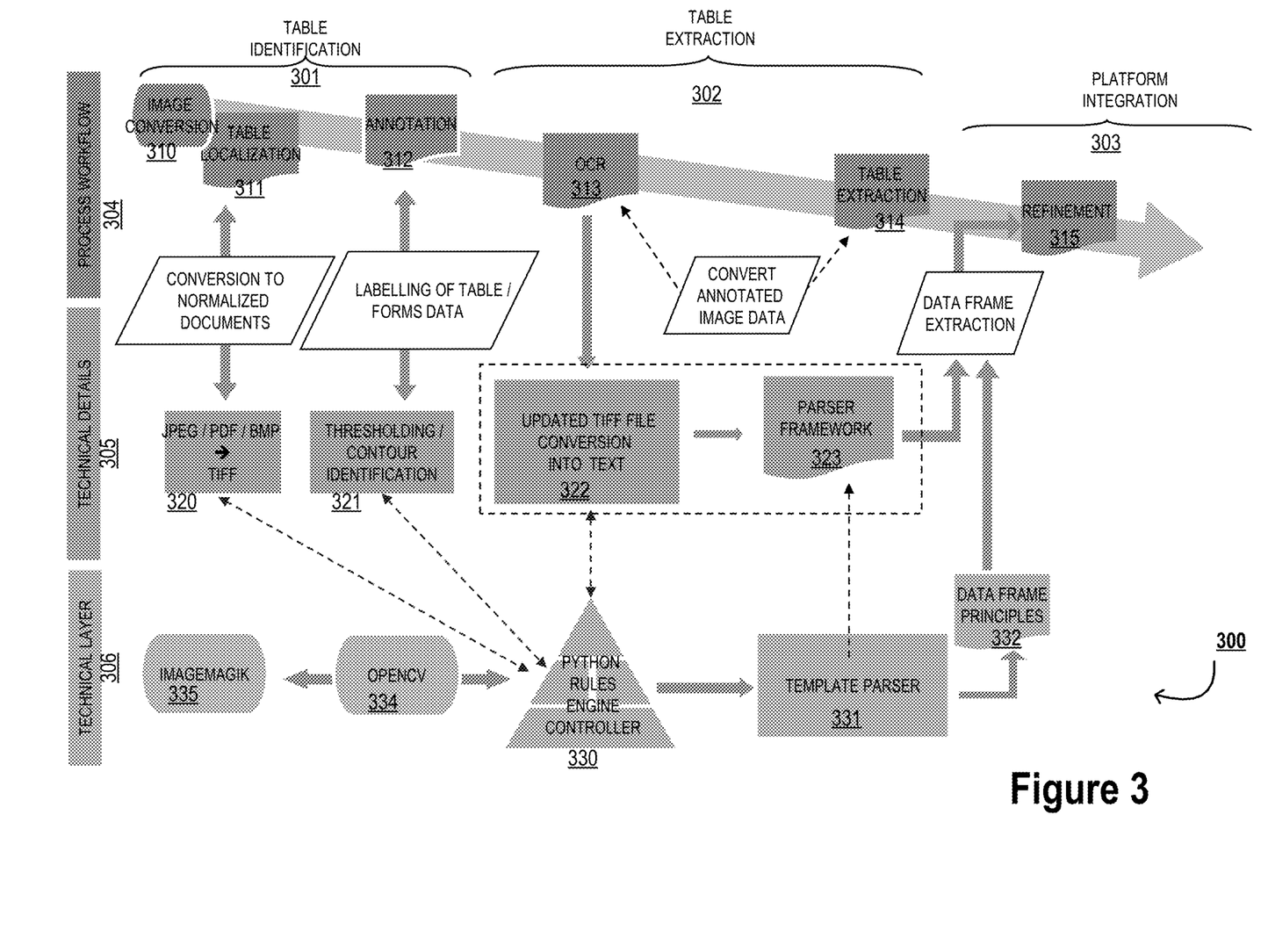
FIG. 3 depicts a multi-layer process workflow 300, in accordance with one embodiments of the present invention.

FIG. 3 depicts a multi-layer process workflow 300 in accordance with one embodiments of the present invention. As shown, the process workflow 300 illustrates a detailed view of the invention workflow by showing a high level process workflow 304, as well as technical details 305, and technical layer 306. The process begins with table identification 301, wherein the features and attributes of a graphical representation are identified. For illustrative purpose, in this particular embodiment, the features and attributes are referred to as tables, but it is understood that depending on various chart types identified in the graphical representation or image, the features and attributes identified may be any number of various other graphical information, such as graphs, grids, chart segments, or physical objects within the graphical representation such as buildings, cars, people, and the like.

At the process workflow 304 layer, the process begins by receiving a graphical representation and converting the image as shown in step 310. Graphical representations of multiple file types such as JPEG, PDF, BMP and the like may be converted into a normalized file type such as TIFF so as to produce more uniform data. In some embodiments, the resulting converted file type may be a number of other file types other than TIFF based on the configuration of the invention. After the graphical representation image is converted, the invention utilizes a convolutional neural network analysis to localize tables, features, and attributes in the graphical representation, as well as identify the various contours and boundaries in the graphical representation.

Figure 4:
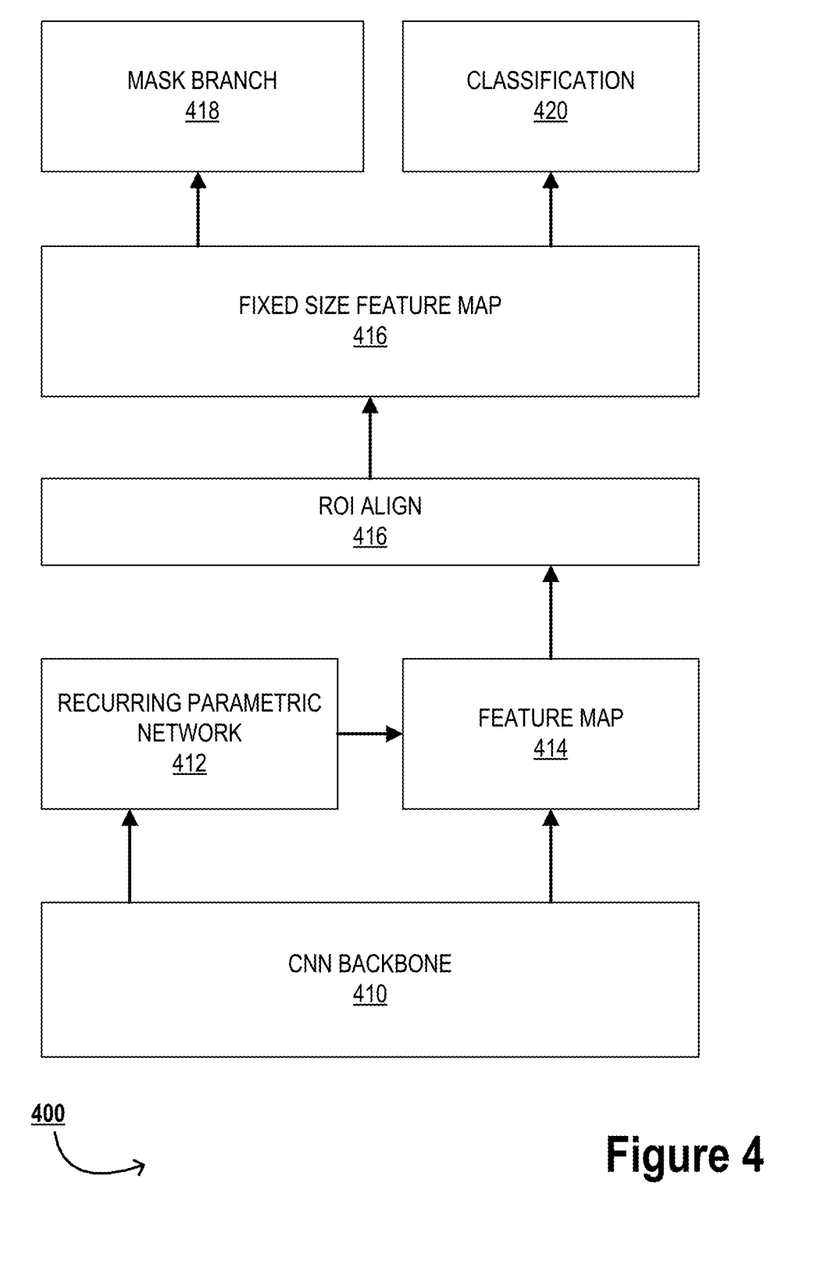
FIG. 4 depicts a process flow 400 for convolutional neural network analysis of graphical representations, in accordance with one embodiment of the present invention.

The use of the convolutional neural network analysis is discussed in more detail with respect to FIG. 4; however, the table localization 311 and thresholding/contour identification 321 steps are illustrated here in FIG. 3 in order to convey where these steps occur in the overall process 300. As shown, the process utilizes a Python rules engine controller 330 to leverage the capabilities of multiple programs such as opencv and imagemagik for support in image conversion and thresholding/contour identification 321. As tables, features, attributes, boundaries and contours are identified in the graphical representation, these various objects are assigned labels and annotated on the graphical representation as shown at annotation step 312.

Next, as shown in FIG. 3, the process moves to the table extraction 302, wherein the identified features and attributes of the graphical representation are further processed and analyzed. Optical character recognition 313 ("OCR") is used to convert annotated image data from step 312 and extract data. Python rules engine controller 330 is utilized in the technical layer 306 to convert information from the converted graphical representation into text and numerical information, as shown by block 322. At this stage, a template parser 331 is implemented within the parser framework 323 to separate and extract the textual data from the graphical representation. Also shown in technical layer 306 is the use of data frame principles 332 in the parsing and extraction process. Data frame principles 332 may be obtained from the chart repository 158, discussed in more detail in FIG. 5, and include specific instructions for the method of extracting data from the converted graphical representation based on how each particular graphical representation is classified. Finally, the data undergoes a refinement process for integration within the recognition and extraction platform 156. This is represented in the platform integration 303, which includes refinement 315. Refinement may include any number of data modifications in order to ensure uniformity of data storage. In some embodiments, the extracted data for each graphical representation is stored in an extensible markup language ("XML") format.

FIG. 4 depicts a process flow 400 for convolutional neural network analysis of graphical representations, in accordance with once embodiment of the present invention. Convolutional neural network ("CNN") is a class of deep, feed-forward artificial neural networks, most commonly applied to analyzing visual imagery. Compared to other image classification algorithms, CNNs use relatively little pre-processing, and in some embodiments the CNN uses a recurring parametric network optimization to learn filters that traditionally are hand-engineered. This results in a reduction of human effort which offers a major advantage over conventional applications. In some embodiments, such as the one depicted in FIG. 4, the present invention utilizes a mask region CNN ("Mask RCNN") in order to segment graphical representations and analyze pixel content in order to identify and extract image attributes based on their particular contours, and identify these attributes using mask layers.

As shown in FIG. 4, the process 400 begins at block 410, where a CNN backbone receives a graphical representation for processing. The graphical representation is fed through the CNN backbone 410 to obtain a feature map 414 which includes regions of interest ("ROIs") representing how the CNN backbone 410 has interpreted the boundaries of the features and attributes contained in the graphical representation. The feature map 414 is optimized by the recurring parametric network ("RPN") as shown in block 412. The RPN 412 is a form of optimization for verifying that all the features identified are aligned with the original graphical data. In addition, the RPN may identify highly-overlapping ROIs and assign a confidence score, and thus select the feature with the highest confidence prediction. The number of recurring loops or iterations employed by the RPN are identified here based on the training model designed by the user. As such, the RPN can be configured to execute any number of iterations in various embodiments in order to optimize accuracy and efficiency.

Next, as shown in block 416, the process proceeds with an ROI align step in order to produce a fixed size feature map 416. The various ROIs identified in the feature map 414 are verified in ROI align 416 to ensure that they align with the original graphical representation. Once this verification has been completed, the result is a fixed size feature map 416, which contains numerical data corresponding to the identified features within the graphical representation. At this point, the process further analyzes the fixed size feature map 416 in order to produce data that can be further analyzed by applying the mask branch 418 and classification 410 steps. Through the mask branch 418 processing step, particular coordinates within the feature map are identified based on pixel boundaries of the graphical representation. This allows the process to extract the features based on pixel boundaries such that they can be further processed to determine proportional data and other identifiable attributes. In classification step 420, the mask RCNN module communicates with chart repository 158 in order to determine the chart type represented within the graphical representation, as discussed in FIG. 5. The end result of the process 400 is a feature map of the graphical representation with identified mask pixel boundaries and chart type classification.

Figure 5:
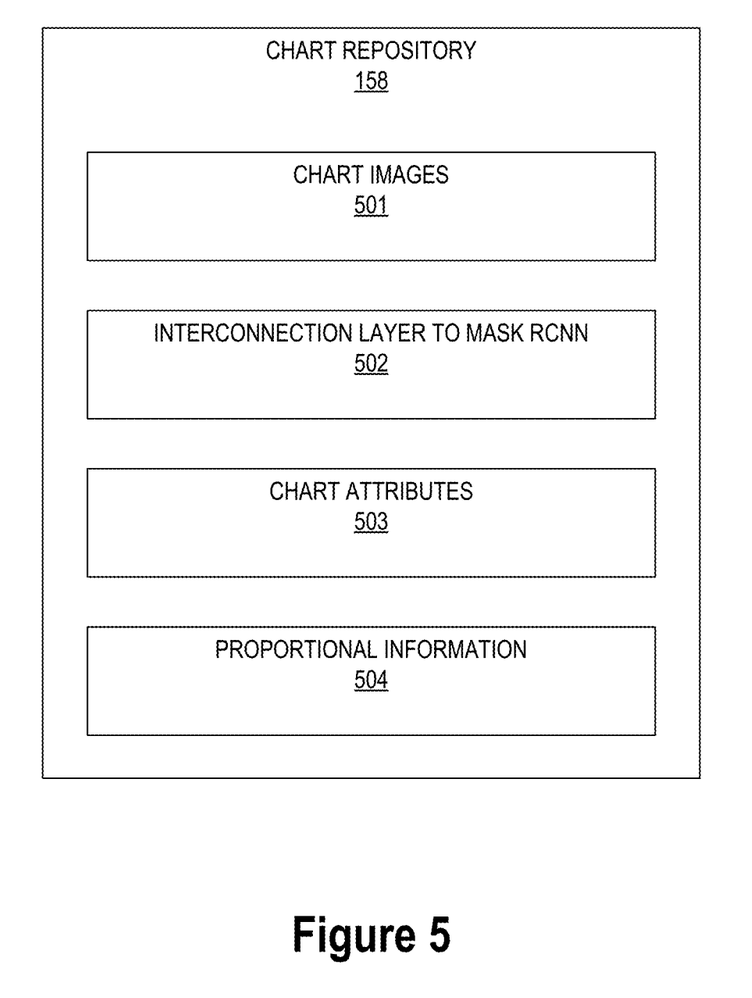
FIG. 5 depicts a detailed view 500 of the chart repository 158, in accordance with one embodiment of the present invention.

FIG. 5 depicts a detailed view 500 of the chart repository 158, in accordance with one embodiment of the present invention. As shown, chart repository 158 includes chart images 501, interconnection layer to mask RCNN 502, chart attributes 503, and proportional information 504. Chart images 501 comprises multiple representational chart images for each of the various chart types included in the chart repository 158. These chart images 501 may include a number of different types of charts that the invention is designed to analyze and extract data from. The interconnection layer 502 represents the channel for providing chart images 501 and other information to the mask RCNN.

In some embodiments, this information may include chart attributes 503 and proportional information 504. Chart attributes 503 include information for each chart type identified by Mask RCNN. For instance, in some embodiments, Mask RCNN may identify a specific graphical representation includes a pie chart. The chart repository 158 may be accessed by the Mask RCNN module to determine the axis and contour definitions for that particular chart type. For instance, in some embodiments, the chart attributes 503 may include parameters for separating contours based on an identified spatial distance between pixels or groups of pixels within the graphical representation. In other embodiments, the chart attributes 503 may include a definition based on identified pixel color, such that boundaries and contours should be identified based on coloration differences between identified features. Furthermore, the Mask RCNN module may access proportional information 504, which includes definitional data for identification of features and attributes within a graphical representation based on numerical proportional differences. For instance, in some embodiments, such as the case of an identified pie chart, the proportional data 504 for that particular chart type may indicate that a certain percentage be derived from the proportional difference in identified features. Data extracted from the graphical representations may not be exact data, but relative proportions within the data are retained.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for information extraction and analysis, the system comprising:
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
   receive a graphical representation for analysis;
   process the graphical representation to convert the graphical representation to a standard file type and remove unnecessary information, wherein removing unnecessary information further comprises removing axis and grid information;
   detect features within the graphical representation using a convolutional neural network analysis by identifying boundary thresholds and contours within the graphical representation, wherein detecting features within the graphical representation further comprises using OpenCV for image conversion and thresholding;
   generate a feature map of the graphical representation comprising detected features in the graphical representation;
   access a chart repository containing classification attributes and proportional information for multiple chart types;
   classify the graphical representation according to one of the multiple chart types based on the classification attributes from the chart repository;
   analyze the detected features using proportional information for the classification of the graphical representation, wherein using proportional information for the classification of the graphical representation further comprises deriving a percentage value based on a proportional difference in identified features of a pie chart;

extract data from the detected features using optical character recognition and proportional analysis; and store the extracted data in an accessible format, wherein the extracted data from the detected features includes contour data and numerical data series.

2. The system of claim 1, wherein the detection of features within the graphical representation further comprises repeatedly analyzing the graphical representation to identify regions of interest within the graphical representation.

3. The system of claim 1, wherein the proportional information comprises thresholds for identifying boundaries and contours based on differences identified in pixel data for the graphical representation.

4. The system of claim 1, wherein the feature map comprises overlaying feature masks and annotated information on the graphical representation.

5. The system of claim 1, wherein extracting the data from the detected features includes parsing the detected features and creating separate files for each detected feature.

6. The system of claim 1, wherein storing the extracted data in an accessible format further comprises storing the detected features, contour data, and numerical data series in an extensible markup language file.

7. The system of claim 1, wherein the standard file type comprises a tag image file format.

8. A computer program product for information extraction and analysis with at least one non-transitory computer-readable medium having computer-readable program code portions embodied therein, the computer-readable program code portions comprising:

an executable portion configured to receive a graphical representation for analysis;

an executable portion configured to process the graphical representation to convert the graphical representation to a standard file type and remove unnecessary information, wherein removing unnecessary information further comprises removing axis and grid information;

an executable portion configured to detect features within the graphical representation using a convolutional neural network analysis by identifying boundary thresholds and contours within the graphical representation, wherein detecting features within the graphical representation further comprises using OpenCV for image conversion and thresholding;

an executable portion configured to generate a feature map of the graphical representation comprising detected features in the graphical representation;

an executable portion configured to access a chart repository containing classification attributes and proportional information for multiple chart types;

an executable portion configured to classify the graphical representation according to one of the multiple chart types based on the classification attributes from the chart repository;

an executable portion configured to analyze the detected features using proportional information for the classification of the graphical representation, wherein using proportional information for the classification of the graphical representation further comprises deriving a percentage value based on a proportional difference in identified features of a pie chart;

an executable portion configured to extract data from the detected features using optical character recognition and proportional analysis; and an executable portion configured to store the extracted data in an accessible format, wherein the extracted data from the detected features includes contour data and numerical data series.

9. The computer program product of claim 8, wherein the detection of features within the graphical representation further comprises repeatedly analyzing the graphical representation to identify regions of interest within the graphical representation.

10. The computer program product of claim 8, wherein the proportional information comprises thresholds for identifying boundaries and contours based on differences identified in pixel data for the graphical representation.

11. The computer program product of claim 8, wherein the feature map comprises overlaying feature masks and annotated information on the graphical representation.

12. The computer program product of claim 8, wherein extracting the data from the detected features includes parsing the detected features and creating separate files for each detected feature.

13. The computer program product of claim 8, wherein storing the extracted data in an accessible format further comprises storing the detected features, contour data, and numerical data series in an extensible markup language file.

14. The computer program product of claim 8, wherein the standard file type comprises a tag image file format.

15. A computer-implemented method for information extraction and analysis, the method comprising:

processing the graphical representation to convert the graphical representation to a standard file type and remove unnecessary information, wherein removing unnecessary information further comprises removing axis and grid information;

detecting features within the graphical representation using a convolutional neural network analysis by identifying boundary thresholds and contours within the graphical representation, wherein detecting features within the graphical representation further comprises using OpenCV for image conversion and thresholding;

generating a feature map of the graphical representation comprising detected features in the graphical representation;

accessing a chart repository containing classification attributes and proportional information for multiple chart types;

classifying the graphical representation according to one of the multiple chart types based on the classification attributes from the chart repository;

analyzing the detected features using proportional information for the classification of the graphical representation, wherein using proportional information for the classification of the graphical representation further comprises deriving a percentage value based on a proportional difference in identified features of a pie chart;

extracting data from the detected features using optical character recognition and proportional analysis; and storing the extracted data in an accessible format, wherein the extracted data from the detected features includes contour data and numerical data series.

16. The computer-implemented method of claim 15, wherein the detection of features within the graphical representation further comprises repeatedly analyzing the graphical representation to identify regions of interest within the graphical representation.

17. The computer-implemented method of claim 15, wherein the proportional information comprises thresholds for identifying boundaries and contours based on differences identified in pixel data for the graphical representation.

18. The computer-implemented method of claim 15, wherein the feature map comprises overlaying feature masks and annotated information on the graphical representation.

19. The computer-implemented method of claim 15, wherein extracting the data from the detected features includes parsing the detected features and creating separate files for each detected feature.

20. The computer-implemented method of claim 15, wherein storing the extracted data in an accessible format further comprises storing the detected features, contour data, and numerical data series in an extensible markup language file.

* * * * *